US011677119B2

(12) United States Patent
Ryu (10) Patent No.: US 11,677,119 B2
(45) Date of Patent: Jun. 13, 2023

(54) SECONDARY BATTERY (71) Applicant: Samsung SDI Co., Ltd., Yongin-si (KR)

(72) Inventor: Jaelim Ryu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 90 days.

(21) Appl. No.: 16/622,804

(22) PCT Filed: Jan. 30, 2018

(86) PCT No.: PCT/KR2018/001271
§ 371 (c)(1),
(2) Date: Dec. 13, 2019

(87) PCT Pub. No.: WO2019/004551
PCT Pub. Date: Jan. 3, 2019

(65) Prior Publication Data
US 2020/0194765 A1 Jun. 18, 2020

(30) Foreign Application Priority Data

Jun. 27, 2017 (KR) .................. 10-2017-0081389

(51) Int. Cl.
*H01M 50/50* (2021.01)
*H01M 50/55* (2021.01)
(Continued)

(52) U.S. Cl.
CPC ......... *H01M 50/50* (2021.01); *H01M 50/209* (2021.01); *H01M 50/503* (2021.01);
(Continued)

(58) Field of Classification Search
CPC ....... H01M 50/296; H01M 50/50–529; H01M 50/543–557; H01M 50/20–209
See application file for complete search history.

(56) References Cited

U.S. PATENT DOCUMENTS

2010/0227212 A1 9/2010 Kim
2011/0229754 A1 9/2011 Zhao et al.
(Continued)

FOREIGN PATENT DOCUMENTS

CN 101593822 A 12/2009
CN 103390742 A 11/2013
(Continued)

OTHER PUBLICATIONS

Machine translation of WO 2013/083221, Fees et al. (Year: 2013).*
(Continued)

*Primary Examiner* — Jonathan Crepeau
*Assistant Examiner* — Jacob Buchanan
(74) *Attorney, Agent, or Firm* — Lewis Roca Rothgerber Christie LLP (57) ABSTRACT

To improve the safety of a secondary battery, the present disclosure provides a secondary battery including: a plurality of battery cells each including a case and an electrode assembly accommodated in the case; a plurality of first bus bars electrically connected to the plurality of battery cells and having a first thickness, the plurality of first bus bars being apart from each other with a predetermined gap therebetween; and a second bus bar arranged above the plurality of first bus bars and electrically connected to the plurality of first bus bars, the second bus bar having a second thickness greater than the first thickness.

13 Claims, 4 Drawing Sheets

(51) Int. Cl.
  *H01M 50/514*   (2021.01)
  *H01M 50/553*   (2021.01)
  *H01M 50/503*   (2021.01)
  *H01M 50/209*   (2021.01)
  *H01M 50/522*   (2021.01)

(52) U.S. Cl.
  CPC ....... *H01M 50/514* (2021.01); *H01M 50/522* (2021.01); *H01M 50/55* (2021.01); *H01M 50/553* (2021.01)

(56) References Cited

U.S. PATENT DOCUMENTS

| | | | | |
|---|---|---|---|---|
| 2012/0009461 | A1* | 1/2012 | Kim | H01M 50/502 |
| | | | | 429/158 |
| 2012/0321936 | A1* | 12/2012 | Song | H01M 50/213 |
| | | | | 429/159 |
| 2013/0052511 | A1 | 2/2013 | Khakhalev | |
| 2013/0157113 | A1* | 6/2013 | Yoshioka | H01G 11/10 |
| | | | | 429/158 |
| 2015/0069829 | A1* | 3/2015 | Dulle | B60L 50/61 |
| | | | | 307/9.1 |
| 2015/0207127 | A1* | 7/2015 | Davis | H01M 50/20 |
| | | | | 429/90 |
| 2015/0243957 | A1 | 8/2015 | Han et al. | |
| 2017/0054131 | A1* | 2/2017 | Yokota | H01M 10/0525 |
| 2017/0062789 | A1 | 3/2017 | Sim et al. | |
| 2017/0125770 | A1 | 5/2017 | Kim et al. | |
| 2019/0379015 | A1* | 12/2019 | Ochi | H01M 50/20 |

FOREIGN PATENT DOCUMENTS

| | | | | |
|---|---|---|---|---|
| CN | 103733386 | A | | 4/2014 |
| CN | 104852010 | A | | 8/2015 |
| CN | 106654138 | A | | 5/2017 |
| DE | 102012219781 | A1 | | 4/2014 |
| JP | 2013-45508 | A | | 3/2013 |
| JP | 2016-54128 | A | | 4/2016 |
| KR | 10-2010-0099596 | A | | 9/2010 |
| KR | 10-2015-0099193 | A | | 8/2015 |
| KR | 10-2016-0026469 | A | | 3/2016 |
| KR | 10-2016-0068722 | A | | 6/2016 |
| KR | 10-2017-0025074 | A | | 3/2017 |
| KR | 10-2017-0052324 | A | | 5/2017 |
| WO | WO-2013083221 | A | * | 6/2013 ............ H01M 50/20 |
| WO | WO-2018139350 | A1 | * | 8/2018 ............ H01M 50/20 |

OTHER PUBLICATIONS

International Search Report for corresponding International Application No. PCT/KR2018/001271, dated Jun. 26, 2018, 5pp.
EPO Extended European Search Report dated Feb. 11, 2021, issued in corresponding European Patent Application No. 18824049.3 (8 pages).
CN First Office action dated Nov. 12, 2021 issued in corresponding CN Application No. 201880043483.X, 10 pages, with English translation, 15 pages.
CN Office action issued in CN Application No. 201880043483.X on Jul. 5, 2022 (7 pages) and English language translation (12 pages).
Chinese Decision of Rejection dated Jan. 5, 2023 issued in corresponding Chinese Patent Application No. 201880043483.X (21 pages, including 14 pages of English translation).

* cited by examiner

SECONDARY BATTERY

CROSS-REFERENCE TO RELATED APPLICATION(S)

This application is a National Phase Patent Application of International Patent Application Number PCT/KR2018/001271, filed on Jan. 30, 2018, which claims priority of Korean Patent Application No. 10-2017-0081389, filed Jun. 27, 2017. The entire contents of both of which are incorporated herein by reference.

TECHNICAL HELD

The present disclosure relates to a secondary battery.

BACKGROUND ART

In general, secondary batteries are rechargeable unlike non-rechargeable primary batteries. Secondary batteries are used as energy sources of devices such as mobile devices, electric vehicles, hybrid electric vehicles, electric bicycles, and uninterruptible power supplies, and according to the types of external devices using secondary batteries, secondary batteries may be used in a single-cell form or a pack or module form in which a plurality of cells are connected as a unit.

A small mobile device such as a cellular phone may be operated for a predetermined time using a single battery, and the number of cells in a battery may be increased to increase the output voltage or current of the battery for application to devices such as electric vehicles and hybrid electric vehicles, which have long operating times and consume large amounts of power.

In such a second battery in which a plurality of battery cells are closely arranged, if any one battery cell deteriorates, neighboring battery cells may sequentially deteriorate or the safety of the battery cells may be markedly lowered because of, for example, thermal runaway, and thus, the possibility of negligent accidents may be increased.

DESCRIPTION OF EMBODIMENTS

Technical Problem

The present disclosure relates to a secondary battery structure.

Solution to Problem

According to an embodiment of the present disclosure, a secondary battery includes: a plurality of battery cells each including a case and an electrode assembly accommodated in the case; a plurality of first bus bars electrically connected to the plurality of battery cells and having a first thickness, the plurality of first bus bars being apart from each other with a predetermined gap therebetween; and a second bus bar arranged above the plurality of first bus bars and electrically connected to the plurality of first bus bars, the second bus bar having a second thickness greater than the first thickness.

According to the embodiment, the plurality of first bus bars may include at least one sub-bus bar electrically connected to the plurality of battery cells.

According to the embodiment, each of the plurality of first bus bars may include a plurality of sub-bus bars electrically connected to the plurality of battery cells, sides of the plurality of sub-bus bars may be apart from each other with a predetermined gap therebetween, and other sides of the plurality of sub-bus bars may be connected to each other.

According to the embodiment, each of the plurality of battery cells may include an electrode terminal, the sides of the plurality of sub-bus bars may be electrically connected to the electrode terminals of the plurality of battery cells, and the other sides of the plurality of sub-bus bars may be electrically connected to the second bus bar.

According to the embodiment, each of the plurality of sub-bus bars may include a first welding portion on one side thereof and a second welding portion on another side thereof, the first welding portions of the plurality of sub-bus bars may protrude toward the electrode terminals, and the second welding portions of the plurality of sub-bus bars may protrude toward the second bus bar.

According to the embodiment, the second bus bar may have a width which increases in directions from both end portions of the second bus bar toward a center portion of the second bus bar.

According to the embodiment, the plurality of first bus bars may be coupled to the second bus bar by welding.

According to the embodiment, the plurality of first bus bars may include a first metal, the second bus bar may include a second metal, and the second metal may have lower resistance than the first metal.

According to the embodiment, the plurality of first bus bars and the second bus bar may include aluminum (Al).

According to another embodiment of the present disclosure, a secondary battery includes: a plurality of battery cells each including an electrode terminal; and a bus bar unit including a plurality of first bus bars and a second bus bar, the plurality of first bus bars being electrically connected to the electrode terminals of the plurality of battery cells and being arranged with a predetermined gap therebetween, the second bus bar being arranged above the plurality of first bus bars and being electrically connected to the plurality of first bus bars, wherein the plurality of first bus bars include one or more sub-bus bar which are electrically connected to the electrode terminals and are provided in one piece.

According to the embodiment, each of the plurality of first bus bars may have a first thickness, and the second bus bar may have a second thickness greater than the first thickness.

Advantageous Effects of Disclosure

As described above, according to the embodiments of the present disclosure, secondary batteries having improved safety may be realized. However, the scope of the present disclosure is not limited to the effect.

In addition to the above-described effect, other effects of the present disclosure may be understood from the following description with reference to the accompanying drawings.

MODE OF DISCLOSURE

The present disclosure may be variously modified, and various embodiments may be provided according to the present disclosure. Hereinafter, some embodiments will be illustrated in the accompanying drawings and described in detail. Effects and features of the present disclosure, and implementation methods thereof will be clarified through the following embodiments described in detail with reference to the accompanying drawings. However, the scope and idea of the present disclosure are not limited to the following embodiments but may be implemented in various forms.

Hereinafter, embodiments of the present disclosure will be described in detail with reference to the accompanying drawings. In the following description given with reference to the accompanying drawings, the same elements or corresponding elements are denoted with the same reference numerals, and overlapping descriptions thereof will be omitted.

In the following embodiments, it will be understood that although terms such as "first" and "second" are used to describe various elements, these elements should not be limited by these terms, and these terms are only used to distinguish one element from another.

In the following descriptions of the embodiments, the terms of a singular form may include plural forms unless referred to the contrary.

In addition, terms such as "include" or "comprise" specify features or the presence of stated elements, but do not exclude other features or elements.

In the following embodiments, it will be understood that when a film, a region, or an element is referred to as being "above" or "on" another film, region, or element, it can be directly on the other film, region, or element, or intervening films, regions, or elements may also be present.

In the descriptions of the embodiments, X, Y, and Z axes are not limited to the definition of the Cartesian coordinate system but may be differently defined or construed. For example, the X-axis, the Y-axis, and the Z-axis may be perpendicular to one another, or may represent different directions that are not perpendicular to one another.

In the drawings, the sizes of elements may be exaggerated for clarity. For example, in the drawings, the size or thickness of each element may be arbitrarily shown for illustrative purposes, and thus the present disclosure should not be construed as being limited thereto.

Figure 1:
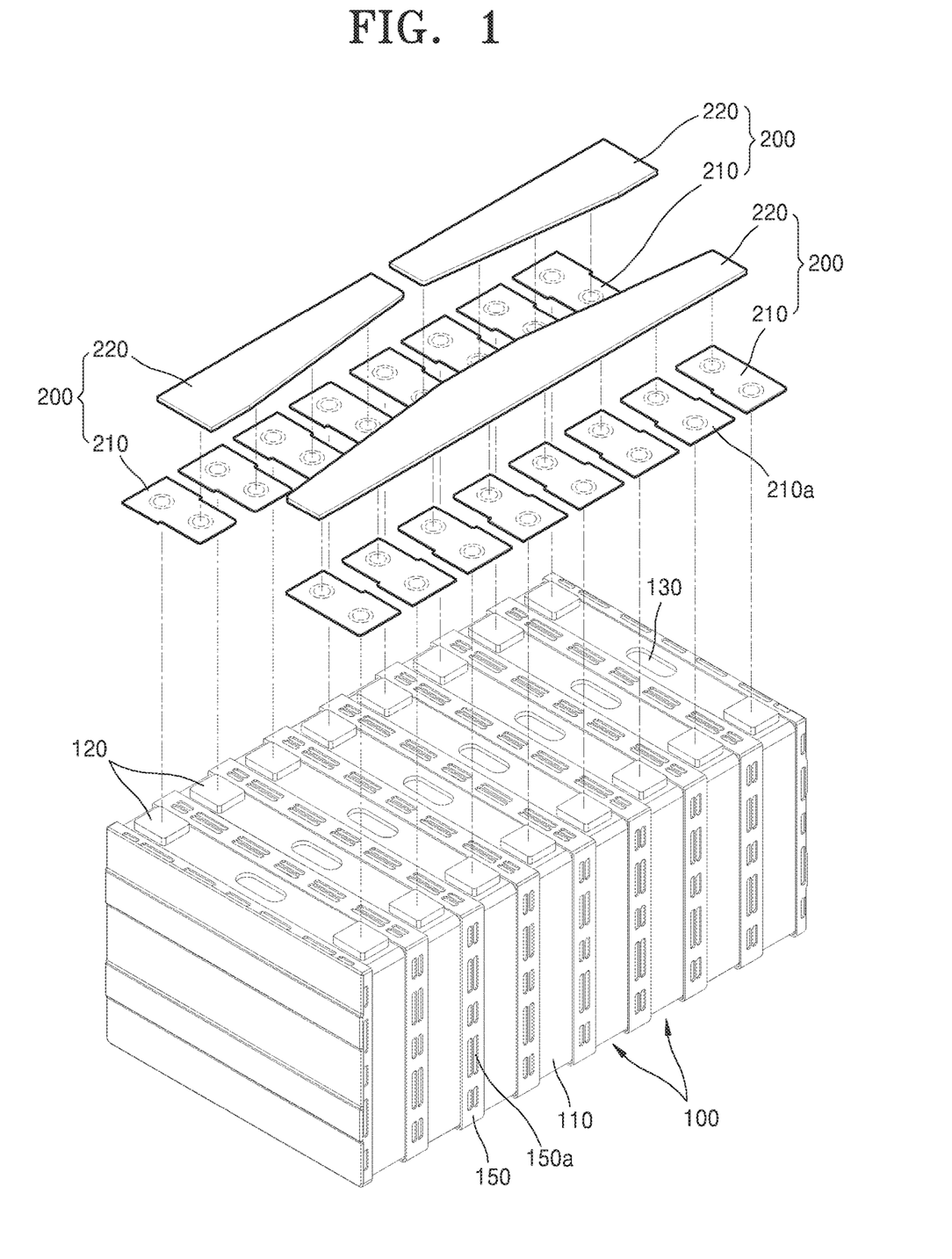
FIG. 1 is an exploded perspective view schematically illustrating a secondary battery according to an embodiment of the present disclosure.

FIG. 1 is a schematic exploded perspective view illustrating a secondary battery according to an embodiment of the present disclosure.

Referring to FIG. 1, the secondary battery according to the embodiment of the present disclosure includes: a plurality of battery cells 100 each including a case 110 and an electrode assembly (not shown) accommodated in the case 110; a plurality of first bus bars 210 electrically connected to the plurality of battery cells 100; and a second bus bar 220 arranged above the plurality of first bus bars 210 and electrically connected to the plurality of first bus bars 210.

The plurality of battery cells 100 may be any type of secondary battery cells such as lithium ion battery cells, cylindrical secondary battery cells, or polymer secondary battery cells. That is, the battery cells 100 are not limited to a particular shape or type.

For example, each of the plurality of battery cells 100 may include the case 110, the electrode assembly (not shown) accommodated in the case 110, and electrode terminals 120 electrically connected to the electrode assembly and exposed to the outside of the case 110. For example, the electrode terminals 120 may form the upper sides of the plurality of battery cells 100 and may be exposed to the outside of the cases 110. Although not shown, each of the electrode assemblies may include a positive electrode plate, a separator, and a negative electrode plate, and may be a wound-type or stacked type electrode assembly. The cases 110 accommodate the electrode assemblies, and the electrode terminals 120 are formed on the outer sides of the cases 110 for electrical connection between the electrode assemblies and a protective circuit.

For example, the plurality of battery cells 100 neighboring each other may be electrically connected through the electrode terminals 120 in series or parallel to each other by connecting the electrode terminals 120 using a bus bar unit 200.

Safety vents 130 may be formed in the cases 110. The safety vents 130 are relative weak so that when the inside pressure of the cases 110 increases to a preset critical value or higher, the safety vents 130 may be fractured to release gas from the insides of the cases 110.

Spacers 150 may be arranged between the plurality of battery cells 100 neighboring each other. The spacers 150 may electrically insulate the plurality of neighboring battery cells 100 from each other. For example, the cases 110 may have electrical polarities, and the spacers 150 formed of an insulation material may be arranged between the cases 110 to prevent electrical interference between the plurality of neighboring battery cells 100. In addition, according to the present embodiment, the spacers 150 may guarantee proper spaces between the plurality of battery cells 100 and thus provide a heat dissipation path, and to this end, in some cases, the spacers 150 may include heat-dissipation holes 150a.

The spacers 150 may be arranged between the plurality of battery cells 100 and may suppress thermal expansion (swelling) of the plurality of battery cells 100. The cases 110 of the plurality of battery cells 100 may be formed of a deformable metallic material, and the spacers 150 may be formed of a less deformable material such as a polymer material to suppress swelling of the plurality of battery cells 100.

In addition, the secondary battery according to the present embodiment may include the bus bar unit 200 electrically connected to the plurality of battery cells 100, and the bus bar unit 200 may include the plurality of first bus bars 210 and the second bus bar 220 electrically connected to the plurality of first bus bars 210. Referring to FIG. 1, the plurality of first bus bars 210 may be electrically connected to the electrode terminals 120 provided on the plurality of battery cells 100, and the second bus bar 220 may be arranged above the plurality of first bus bars 210 and electrically connected to the plurality of first bus bars 210.

In addition, although not shown, a device such as a temperature sensor may be further arranged above the plurality of battery cells 100. The temperature sensor may be arranged on a portion on which the safety vents 130 and the bus bar unit 200 are not arranged. As described later, the width of the second bus bar 220 of the present embodiment may be less at both ends thereof than at a center portion thereof, and a device such as a temperature sensor may be provided in a space which is formed at a position at which the width of the second bus bar 220 is relatively narrow.

Figure 2:
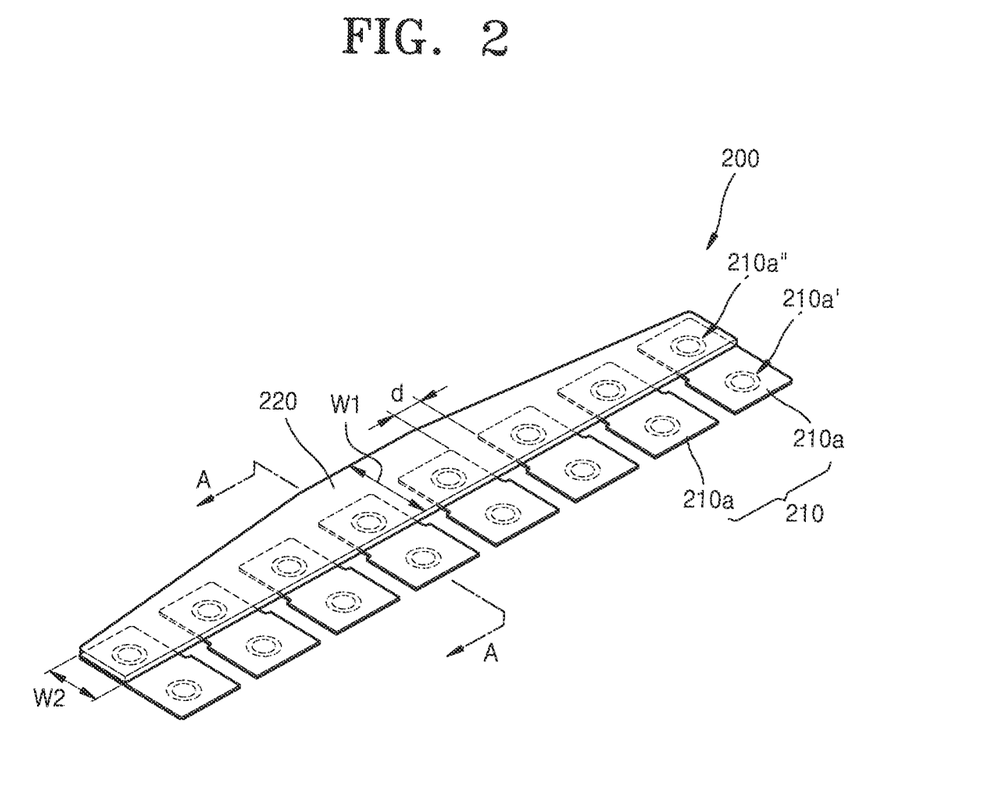
FIG. 2 is a perspective view schematically illustrating a portion of a bus bar unit of the secondary battery illustrated in FIG. 1.

FIG. 2 is a perspective view schematically illustrating a portion of the secondary battery illustrated in FIG. 1.

Referring to FIGS. 1 and 2 together, the secondary battery according to the present embodiment may include the bus bar unit 200, which includes the plurality of first bus bars 210 and the second bus bar 220 electrically connected to the plurality of first bus bars 210. The plurality of first bus bars 210 may be apart from each other with a predetermined gap d therebetween. That is, the plurality of first bus bars 210 may be physically separated from each other and may be electrically connected to each other as the plurality of first bus bars 210 are attached to the second bus bar 220. In the present embodiment, the plurality of first bus bars 210 may be attached to the second bus bar 220 by welding, but the present disclosure is not limited thereto.

In the present embodiment, each of the plurality of first bus bars 210 may include at least one sub-bus bar 210a. In the embodiment shown in FIGS. 1 and 2, each of the plurality of first bus bars 210 is illustrated as having one sub-bus bar 210a. That is, in the present embodiment, it may be understood that each of the plurality of first bus bars 210 corresponds to one sub-bus bar 210a.

As many sub-bus bars 210a as the number of battery cells 100 may be provided, and the sub-bus bars 210a may be electrically connected to the electrode terminals 120 of the plurality of battery cells 100, respectively. Sides of the sub-bus bars 210a may be electrically connected to the electrode terminals 120, respectively, and the other sides of the sub-bus bars 210a may be connected to the second bus bar 220.

In this case, the sub-bus bars 210a may be joined to the electrode terminals 120 and the second bus bar 220 by welding. To this end, each of the sub-bus bars 210a may include first and second welding portions 210a' and 210a'' respectively on one side and the other side thereof. The first welding portion 210a' may be located at one side of the sub-bus bar 210a and may be connected to an electrode terminal 120 of a battery cell 100. Therefore, the first welding portion 210a' may protrude toward the electrode terminal 120 of the battery cell 100. In addition, the second welding portion 210a'' may be located at the other side of the sub-bus bar 210a and may be connected to the second bus bar 220. Therefore, the second welding portion 210a'' may protrude toward the second bus bar 220.

In addition, the second bus bar 220 may have a first width w1 at the center portion thereof and a second width w2 at both end portions thereof. In this case, the first width w1 may be greater than the second width w2, That is, the second bus bar 220 may be widest at the center portion thereof and may gradually become narrower in directions toward both the end portions thereof. Due to the characteristics of the bus bar unit 200, which connects the plurality of battery cells 100, a center portion of the bus bar unit 200 intensively deteriorates, and thus, the width of the center portion of the second bus bar 220 may be adjusted to be relatively large to disperse such deterioration. In addition, since both the end portions of the second bus bar 220 are relatively narrow, spaces for arranging devices such as a temperature sensor may be guaranteed above the plurality of battery cells 100.

Figure 3:
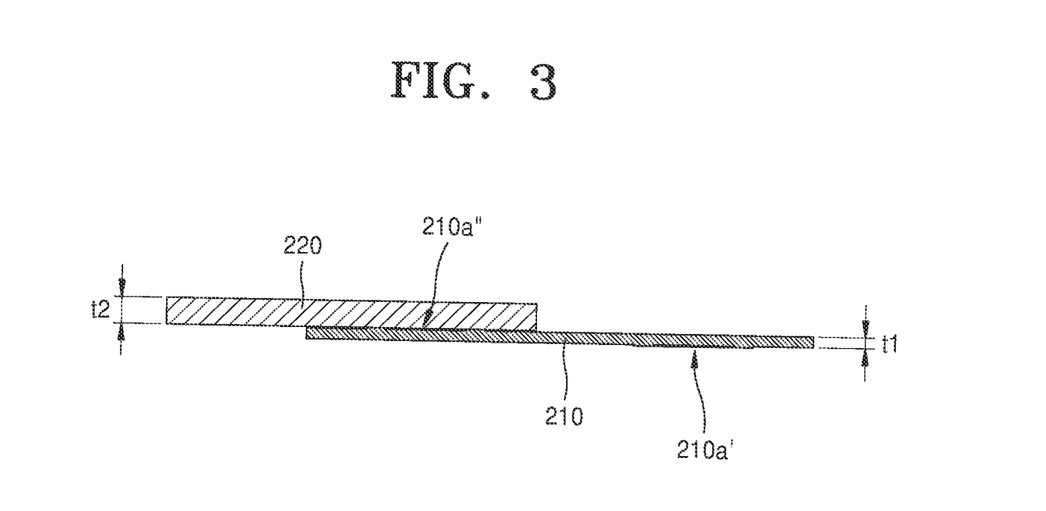
FIG. 3 is a schematic cross-sectional view of the bas bar unit, which is taken along line A-A of FIG. 2.

Referring to FIGS. 2 and 3 together, according to the present embodiment, each of the plurality of first bus bars 210 may have a first thickness t1, and the second bus bar 220 may have a second thickness t2. In this case, the second thickness t2 of the second bus bar 220 may be greater than the first thickness t1 of each of the plurality of first bus bars 210. For example, the first thickness t1 of each of the plurality of first bus bars 210 may be about 20% to about 50% of the second thickness t2 of the second bus bar 220. For example, when the second thickness t2 of the second bus bar 220 is about 1.2 mm to about 2.5 mm, the first thickness t1 of the plurality of first bus bars 210 may be about 0.5 mm to about 1.2 mm.

Since the plurality of first bus bars 210 and the second bus bar 220 transfer current generated from the plurality of battery cells 100, the plurality of first bus bars 210 and the second bus bar 220 may be formed of metallic materials. In an embodiment, the plurality of first bus bars 210 may include a first metal, and the second bus bar 220 may include a second metal having lower resistance than the resistance of the first metal. For example, the first metal may be aluminum (Al), and the second metal may be copper (Cu). In some embodiments, the plurality of first bus bars 210 and the second bus bar 220 may include the same metallic material considering intermetallic welding and weights according to thicknesses.

A thick bus bar having a certain thickness or greater is required to allow high current to flow in a battery module. However, when a thick bus bar is used, it is difficult to attach the thick bus bar to an electrode terminal, To address this, a relatively thin bus bar may be used, and in this case, current tends to flow only through the thin bus bar having relatively low resistance, causing a problem in which a particular portion of the thin bus bar intensively heats.

To address these problems, the secondary battery of the present embodiment includes the second bus bar 220 having a relatively large thickness and the plurality of first bus bars 210 having a smaller thickness than the second bus bar 220. Furthermore, in this case, to prevent current from flowing only through the plurality of first bus bars 210 having a relatively small thickness, the plurality of first bus bars 210 are physically spaced apart from each other such that current transferred to the bus bar unit 200 may flow to the second bus bar 220 having a relatively large thickness. As a result, the problem in which current is concentrated in a specific portion of the bus bar unit 200, particularly in a center portion of the bus bar unit 200 may be addressed, and loss occurring in the form of thermal energy loss may be reduced, thereby improving the efficiency of electricity transmission.

Figure 4:
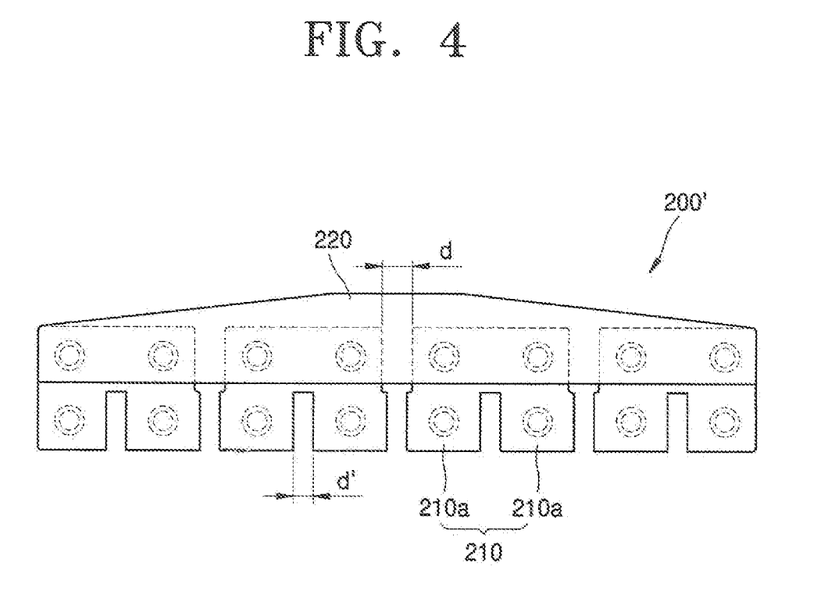
FIG. 4 is a schematic plan view illustrating a portion of a secondary battery according to another embodiment of the present disclosure.

FIG. 4 is a schematic plan view illustrating a portion of a secondary battery according to another embodiment of the present disclosure.

The secondary battery according to the present embodiment is different from the above-disclosed embodiment in the shape of the bus bar unit 200. Therefore, the difference of the bus bar unit 200 will now be mainly described, and descriptions of the same elements as those in the embodiment shown in FIGS. 1 to 3 will be substituted with the previous descriptions.

Referring to FIG. 4, the secondary battery of the present embodiment may include a bus bar unit 200' which includes a plurality of first bus bars 210 and a second bus bar 220 electrically connected to the plurality of first bus bars 210. The plurality of first bus bars 210 may be apart from each other with a predetermined gap d therebetween. That is, the plurality of first bus bars 210 may be physically separated from each other and may be electrically connected to each other as the plurality of first bus bars 210 are attached to the second bus bar 220.

In the present embodiment, each of the plurality of first bus bars 210 may include at least one sub-bus bar 210a, FIG. 4 illustrates an embodiment in which each of the plurality of first bus bars 210 includes a pair of sub-bus bars 210a. Sides of the sub-bus bars 210a may be electrically connected to electrode terminals 120, respectively, and the other sides of the sub-bus bars 210a may be connected to the second bus bar 220.

The sub-bus bars 210a may be provide in one piece. As shown in FIG. 4, sides of the sub-bus bars 210a may be spaced apart with a predetermined gap d' therebetween, and the other sides of the sub-bus bars 210a may be connected to each other as one piece. This is for convenience in manufacturing processes, and thus, a manufacturing process for connecting the plurality of first bus bars 210 to the second bus bar 220 may be simplified.

Figure 5:
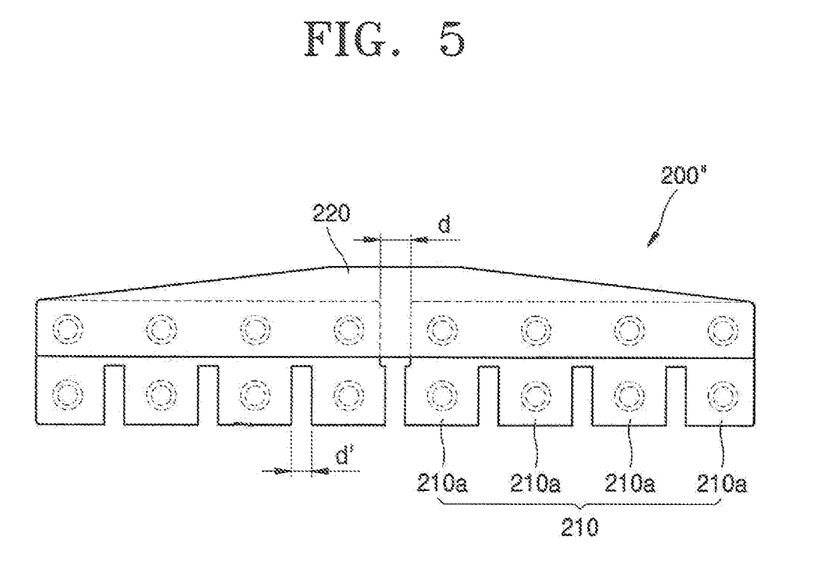
FIG. 5 is a schematic plan view illustrating a portion of a secondary battery according to another embodiment of the present disclosure.

FIG. 5 is a schematic plan view illustrating a portion of a secondary battery according to another embodiment of the present disclosure.

The secondary battery according to the present embodiment is different from the above-disclosed embodiments in the shape of the bus bar unit 200. Therefore, the difference of the bus bar unit 200 will now be mainly described, and descriptions of the same elements as those in the embodiment shown in FIGS. 1 to 3 will be substituted with the previous descriptions.

Referring to FIG. 5, the secondary battery of the present embodiment may include a bus bar unit 200" which includes a plurality of first bus bars 210 and a second bus bar 220 electrically connected to the plurality of first bus bars 210. The plurality of first bus bars 210 may be apart from each other with a predetermined gap d therebetween. That is, the plurality of first bus bars 210 may be physically separated from each other and may be electrically connected to each other as the plurality of first bus bars 210 are attached to the second bus bar 220.

In the present embodiment, each of the plurality of first bus bars 210 may include at least one sub-bus bar 210a. FIG. 5 illustrates an embodiment in which each of the plurality of first bus bars 210 includes pairs of four sub-bus bars 210a. Sides of the sub-bus bars 210a may be electrically connected to electrode terminals 120, respectively, and the other sides of the sub-bus bars 210a may be connected to the second bus bar 220.

The sub-bus bars 210a may be provide in one piece. As shown in FIG. 5, sides of the sub-bus bars 210a may be spaced apart with a predetermined gap d' therebetween, and the other sides of the sub-bus bars 210a may be connected to each other as one piece. This is for convenience in manufacturing processes, and thus, a manufacturing process for connecting the plurality of first bus bars 210 to the second bus bar 220 may be simplified.

Figure 6:
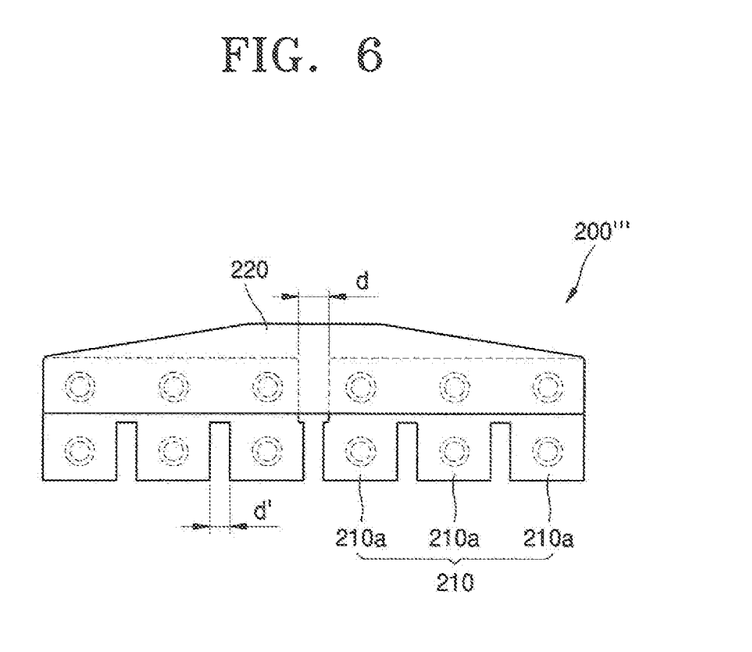
FIG. 6 is a schematic plan view illustrating a portion of a secondary battery according to another embodiment of the present disclosure.

FIG. 6 is a schematic plan view illustrating a portion of a secondary battery according to another embodiment of the present disclosure.

Referring to FIG. 6, the secondary battery of the present embodiment may include a bus bar unit 200''', which includes a plurality of first bus bars 210 and a second bus bar 220 electrically connected to the plurality of first bus bars 210. The bus bar unit 200''' of the present embodiment is different from those in the above-disclosed embodiments in the structure of the plurality of first bus bars 210. That is, each of the plurality of first bus bars 210 of the present embodiment may include three sub-bus bars 210a that are connected to each other. As in the previous embodiments, the plurality of first bus bars 210 may be physically separated from each other with a predetermined gap d therebetween and may be electrically connected to each other as the plurality of first bus bars 210 are attached to the second bus bar 220. In addition, the number of battery cells 100 connected to the bus bar unit 200''' may vary with the number of sub-bus bars 210a. The present disclosure has been described with reference to the embodiments shown in the accompanying drawings for illustrative purposes only, and it will be understood by those of ordinary skill in the art that various modifications and equivalent other embodiments may be made therefrom. Therefore, the scope and spirit of the present disclosure should be defined by the following claims.

The invention claimed is:

1. A secondary battery comprising:
a plurality of battery cells each comprising a case, an electrode assembly accommodated in the case, and an electrode terminal;
a plurality of first bus bars electrically directly connected to the electrode terminals of the plurality of battery cells at respective first welding portions and having a first thickness, the plurality of first bus bars being apart from each other with a predetermined gap therebetween along a first direction; and
a second bus bar arranged above the plurality of first bus bars along a second direction and electrically connected to the plurality of first bus bars at respective second welding portions, the second welding portions being spaced apart from the first welding portions in a third direction crossing the first and second directions, the second bus bar having a second thickness greater than the first thickness,
wherein the plurality of first bus bars comprise a first metal, the second bus bar comprises a second metal, and the second metal has lower resistance than the first metal, and
wherein the second bus bar has the second thickness at regions overlapping the second welding portions.

2. The secondary battery of claim 1, wherein the plurality of first bus bars comprise at least one sub-bus bar electrically connected to the plurality of battery cells.

3. The secondary battery of claim 2, wherein each of the plurality of first bus bars comprises a plurality of sub-bus bars electrically connected to the plurality of battery cells, sides of the plurality of sub-bus bars are apart from each other with a predetermined gap therebetween, and other sides of the plurality of sub-bus bars are connected to each other.

4. The secondary battery of claim 3, wherein the sides of the plurality of sub-bus bars are electrically connected to the electrode terminals of the plurality of battery cells, and the other sides of the plurality of sub-bus bars are electrically connected to the second bus bar.

5. The secondary battery of claim 4, wherein each of the plurality of sub-bus bars comprises a first welding portion of the first welding portions on one side thereof and a second welding portion of the second welding portions on another side thereof, the first welding portions of the plurality of sub-bus bars protrude toward the electrode terminals, and the second welding portions of the plurality of sub-bus bars protrude toward the second bus bar.

6. The secondary battery of claim 1, wherein the second bus bar has a width which increases in directions from both end portions of the second bus bar toward a center portion of the second bus bar.

7. The secondary battery of claim 1, wherein the second metal is copper.

8. The secondary battery of claim 1, wherein the second bus bar is spaced apart in the third direction crossing the first and second directions from the first welding portions of the first bus bars that are welded to the electrode terminals.

9. A secondary battery comprising:
  a plurality of battery cells each comprising an electrode terminal; and
  a bus bar unit comprising a plurality of first bus bars and a second bus bar, the plurality of first bus bars being electrically directly connected to the electrode terminals of the plurality of battery cells at respective first welding portions and being arranged with a predetermined gap therebetween along a first direction, the second bus bar being arranged above the plurality of first bus bars along a second direction and being electrically connected to the plurality of first bus bars at respective second welding portions, the second welding portions being spaced apart from the first welding portions in a third direction crossing the first and second directions,
  wherein each of the plurality of first bus bars comprises one or more sub-bus bars which are electrically connected to the electrode terminals and are provided in one piece,
  wherein each of the plurality of first bus bars has a first thickness, and the second bus bar has a second thickness greater than the first thickness,
  wherein the first bus bars comprise a first metal, the second bus bar comprises a second metal, and the second metal has lower resistance than the first metal, and
  wherein the second bus bar has the second thickness at regions overlapping the second welding portions.

10. The secondary battery of claim 9, wherein the second metal is copper.

11. The secondary battery of claim 9, wherein the second bus bar is spaced apart in the third direction crossing the first and second directions from the first welding portions of the first bus bars that are welded to the electrode terminals.

12. A secondary battery comprising:
  a plurality of battery cells each comprising a case, an electrode assembly accommodated in the case, and an electrode terminal;
  a plurality of first bus bars electrically directly connected to the electrode terminals of the plurality of battery cells at respective first welding portions and having a first thickness, the plurality of first bus bars being apart from each other with a predetermined gap therebetween along a first direction; and
  a second bus bar arranged above the plurality of first bus bars along a second direction and electrically connected to the plurality of first bus bars at respective second welding portions, the second welding portions being spaced apart from the first welding portions in a third direction crossing the first and second directions, the second bus bar having a second thickness greater than the first thickness,
  wherein the plurality of first bus bars and the second bus bar comprise a same material, and
  wherein the second bus bar has the second thickness at regions overlapping the second welding portions.

13. The secondary battery of claim 12, wherein the plurality of first bus bars and the second bus bar comprise aluminum (Al).

* * * * *